TWO-STAGE SYSTEM FOR PREHEATING COMBUSTION AIR

Filed July 9, 1958 5 Sheets-Sheet 1

INVENTORS
Howard H. Nichols
John W. Keller
BY
William B. Jaspert
Attorney.

INVENTORS
Howard H. Nichols
and John W. Keller
BY
William B. Jaspert
Attorney.

TWO-STAGE SYSTEM FOR PREHEATING COMBUSTION AIR

Filed July 9, 1958 5 Sheets-Sheet 3

INVENTORS
Howard H. Nichols
and John D. Keller
BY William B. Jaspert
Attorney.

INVENTORS
Howard H. Nichols
BY & John D. Keller
William B. Jaspert
Attorney.

TWO-STAGE SYSTEM FOR PREHEATING COMBUSTION AIR
Filed July 9, 1958 5 Sheets-Sheet 5
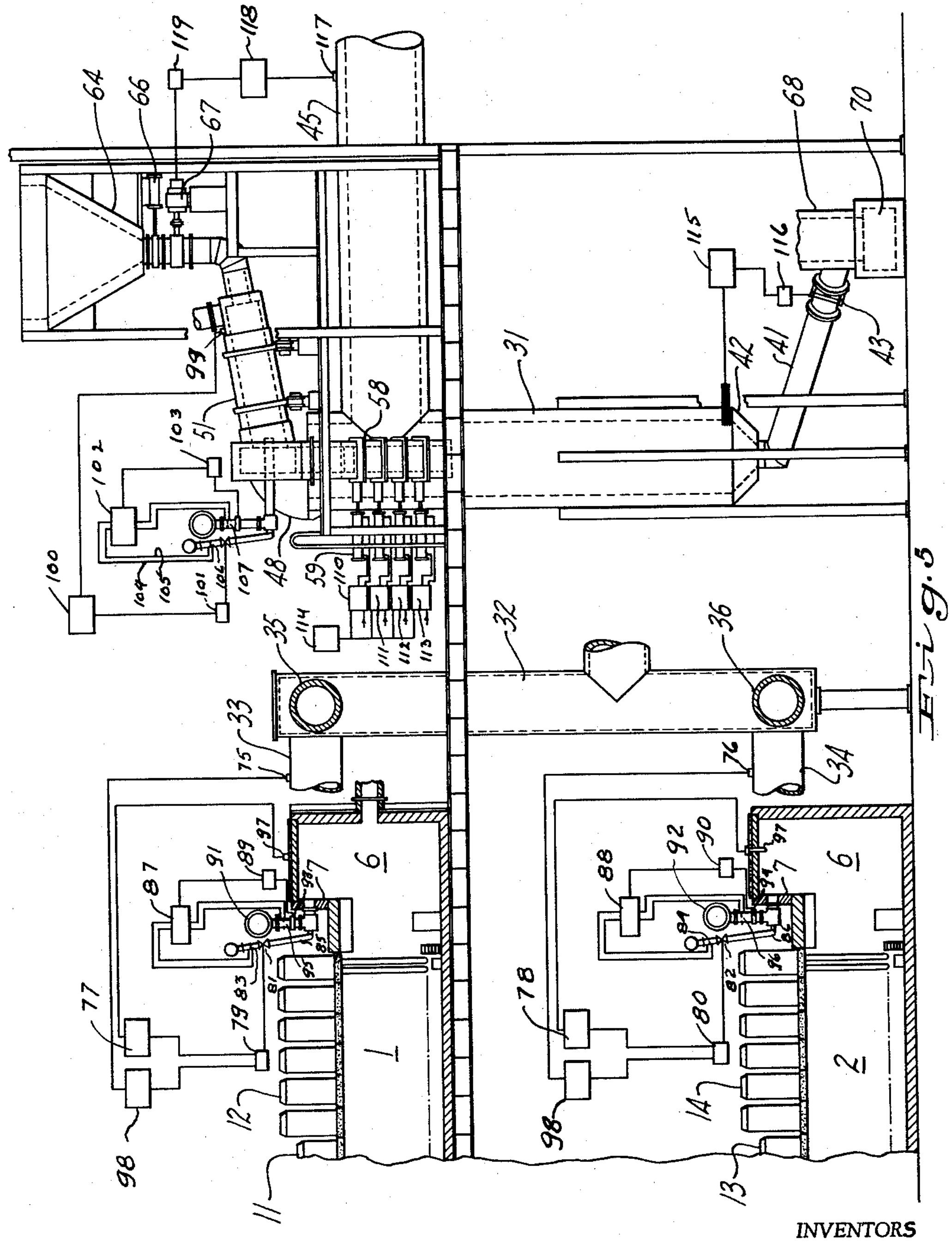
INVENTORS
Howard H. Nichols
BY and John W. Keller
William B Jaspert
Attorney.

3,061,194
Patented Oct. 30, 1962

3,061,194
TWO-STAGE SYSTEM FOR PREHEATING COMBUSTION AIR

Howard H. Nichols and John D. Keller, Pittsburgh, Pa., assignors to Hazen Engineering Company, Pittsburgh, Pa., a corporation of Pennsylvania Filed July 9, 1958, Ser. No. 747,442
2 Claims. (Cl. 236—11)

This invention relates to a method of and apparatus for preheating air for use in industrial heating furnaces such as the hot air blast of blast furnaces, and it is among the objects of the invention to provide a method of preheating air by two stages, the primary stage of which utilizes metallic recuperators or conventional hot blast stoves and a secondary stage consists of increasing the temperature of the air thus preheated by passing it through a regenerator chamber in heat exchange relation with hot falling particles.

Blast furnaces, in conventional use, were designed for melting high grade ores that were heretofore available. The poor grade ores contain more $Fe_3O_4$ and the additional oxygen requires additional reducing agents to remove it from the ore. Consequently, greater quantities of flux, higher temperatures and high quantities of coke have been required. At the present time, most blast furnace operations are using beneficiated ores which are screened, sized and the fines are sintered.

This allows a greater quantity of voids in the blast furnace burden and makes possible the use of greater volumes of air for the smelting process and by the same token, increases the quantity of heat required to maintain a constant or increased production rate. The stoves in use on most blast furnaces are incapable of heating these large quantities of air to the increased temperatures, consequently, it is most important that some new means be developed to increase the air temperature sufficiently to satisfactorily smelt these beneficiated ores.

In accordance with the present invention, preheated air from present type blast furnace regenerative stoves may be further heated by passing it in a continuous stream in heat exchange contact with heated falling particles of refractory material. Because of the limited volume capacity of such regenerative stoves, the present invention is better adapted for use with metallic recuperator structures, preferably of stainless steel, which are capable of heating any volume of air needed for blast furnace requirements.

With some fuels it is impractical to use a metal recuperator to obtain preheated air in excess of approximately 1400° to 1500°; also, with some fuels carrying chemicals which are injurious to stainless steel, it is impractical to even preheat air to the above-mentioned temperatures. Metal recuperators are operating using flue gas temperatures up to 2300° F., but the air temperature is low enough to keep the metal temperature of the stainless steel not over approximately 1500°. It seems practical to use stainless steel recuperators to heat the blast air for blast furnaces to approximately 1000° F. and use a falling particle air heater to bring the blast air temperature up to 2000° F. or higher.

It is among the objects of this invention to employ metal recuperators to provide any required volume of preheated air for industrial heating furnaces at temperatures in excess of the metal temperature of the recuperators.

It is a further object of the invention to increase the temperature of preheated air from recuperators by passing the same in heat exchange relation with falling particles previously heated.

It is a further object of the invention to utilize metal recuperators for partially preheating air which is thereafter exposed to falling particles that have been heated to high temperatures to increase the temperature of the preheated air as desired.

It is another object of the invention to provide apparatus for utilizing falling particles for preheating air which employs a heating means through which the particles are fed in regulated volume to a heat exchange chamber to which air is delivered in a continuous stream to contact the falling particles and from which chamber the falling particles are removed at the bottom, the falling particles themselves forming a seal to prevent the escape of hot air from either the top or bottom of the chamber.

It is a further object of the invention to provide a heat changer employing falling particles in which the particles are fed continuously from a hopper to a heater and from the heater to the heat exchange chamber through which they fall and are collected at the bottom and removed to a conveying means for delivery to the hopper from which they were initially fed to the heater.

Another object of the invention is to utilize air preheated in a metallic recuperator for superheating in a falling particle heat exchanger of the above designated character, which recuperator is heated by blast furnace gas and the products of combustion of the falling particle heater are delivered to the recuperator chamber to thereby recover remaining heat from the products of combustion.

It is a further object of the invention to provide control means for a combined recuperator and falling particle heat exchanger to regulate the volume and temperature of the preheated air delivered by the recuperator structure to the falling particle heat exchanger and for regulating the temperature and rate of flow of the falling particles into the falling particle heater and through the heat exchanger to thereby control the temperature and volume of the superheated air leaving the falling particle heat exchanger.

It is still another object of the invention to maintain a constant discharge air temperature of the primary heating means which may be operated in multiples to supply any desired volume of air at such predetermined temperature to the secondary heating means.

These and other objects of the invention will become more apparent from a consideration of the accompanying drawings constituting a part hereof in which like reference characters designate like parts and in which:

FIGURE 1 is a cross-sectional view, partially in elevation, longitudinally of a metal recuperator and a falling particle heat exchanger taken along the line 1—1 of FIGURE 2.

FIGURE 2, a plan view thereof;

Figure 1:
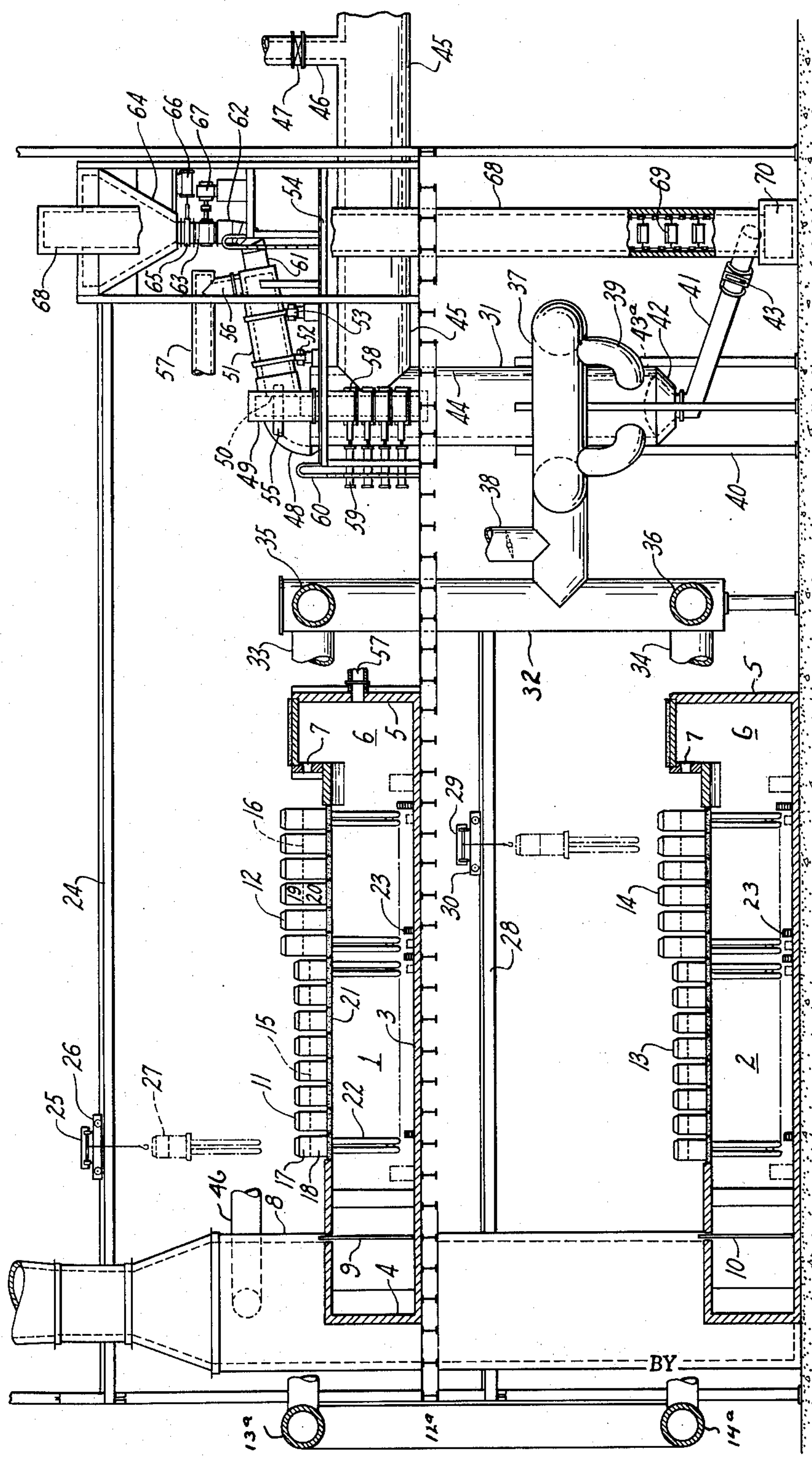
Figure 3:
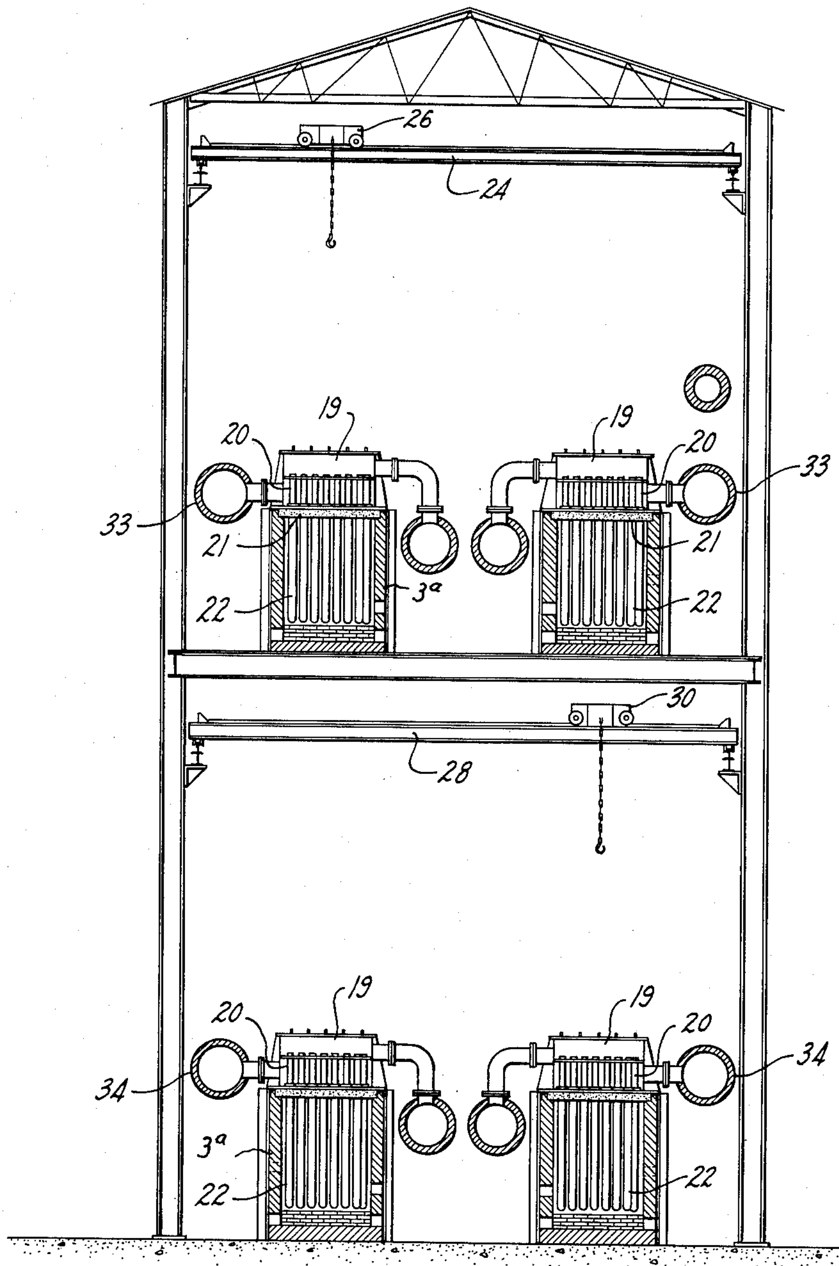
FIGURE 3 is a vertical section, partially in elevation, taken along the line 3—3 of FIGURE 2.

With reference to FIGURE 1 of the drawing, the numerals 1 and 2 designate recuperator chambers of metal recuperators of which there may be four or more, FIGURE 3, depending upon the volume of preheated air required. These recuperators have a bottom wall 3, side walls 3*a*, FIGURES 3, and end walls 4 and 5, the latter forming a wall of a combustion chamber 6, FIGURE 1, fired through a burner port 7 by blast furnace gases or other suitable fuel. The end wall 4 of the recuperator chamber opens to a stack 8, dampers 9 and 10 being provided to regulate the velocity or rate of flow of the hot gases through the recuperator chambers 1 and 2.

The metallic recuperator structure consists of header boxes 11, 12, 13 and 14 which are provided with partitions 15 and 16 dividing them into cold and hot air passages 17, 18 and 19 and 20, respectively, the passages 19 and 20 being larger for handling greater volumes of air because they are on the hot end of the recuperator structure.

The header boxes 11 and 12 are mounted on sectional roof portions 21 of the recuperator chamber and suspended from the header boxes are metallic tubes preferably stainless steel designated by the numeral 22 that extend downwardly into the recuperator chambers 1 and 2 in the path of the hot gases passing from the combustion chamber 6 to the stack 8. Baffles 23 are provided in the base of the recuperator chamber to prevent stratification of the gas flow along the bottom and force it upwardly into wiping contact with the banks of suspended tubes 22.

Only a few of the tubes are shown in FIGURE 1, there being however, banks of tubes suspended from each of the header boxes 11 and 12, as more clearly appears in FIGURE 3 of the drawings. Above the recuperator chamber is a system of tracks 24 supporting a hoist carriage 25 and a transfer car 26 by means of which the header boxes 11 and 12 with their associated tubes 22 may be bodily lifted from the recuperator structure as shown by the dotted lines at 27 for replacement and repairs without seriously interrupting the operation of the recuperator structure. A similar track 28, hoist carriage 29 and transfer car 30 are provided for the lower recuperator 2.

Figure 2:
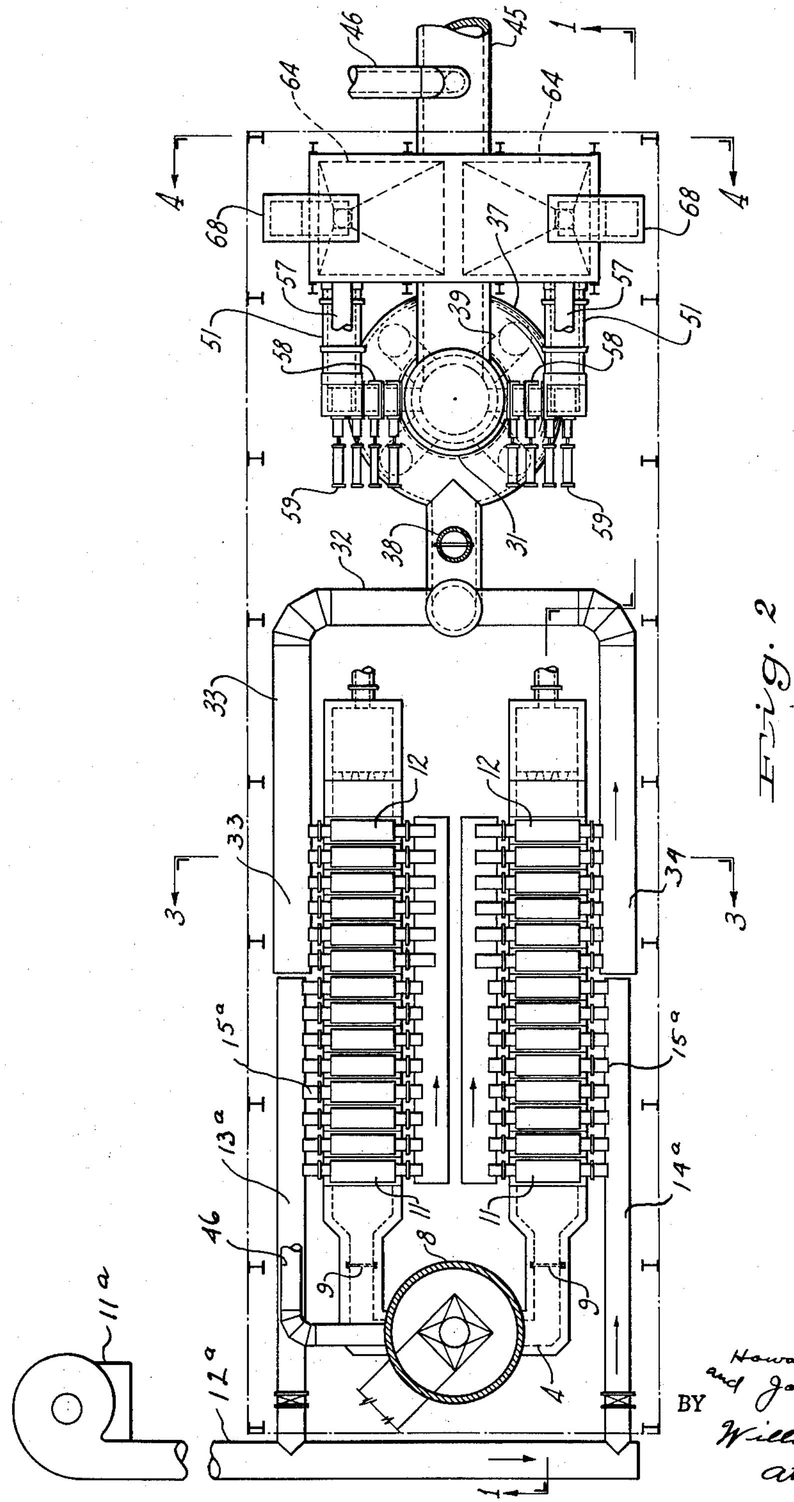

As shown in FIGURE 2, cold air to be preheated is supplied by a high pressure blower **11*a* to an air duct 12*a* common to a pair of manifolds 13*a* and 14*a* connected by short ducts 15*a* to the header boxes 11 and 12**.

An air heater or heat exchange chamber generally designated by the numeral 31, FIGURE 1, is connected by a manifold 32 to the hot air ducts 33, 34 and 35 and 36, of the metal recuperators, the ducts leading to the hot air chambers 18 and 20 of the recuperator header boxes. The heat exchanger 31 has a bustle pipe 37 connected to the manifold 32 which encircles the heat exchanger, as shown, and a snort valve 38 is provided between the manifold 32 and the bustle pipe 37, as shown. A series of air nozzles 39 are connected to the bustle pipe 37 and enter through the wall of the heat exchanger 31 adjacent the bottom thereof.

The heat exchanger is supported on a superstructure consisting of structural steel members 40 to make the bottom thereof accessible for a conduit 41 connected to a hopper-like base 42 of the air heater, a slide valve 43 being provided in the conduit 41 to regulate the flow from the base 42.

The heat exchanger 31 may be constructed of a steel shell with a lining of refractory material 44 such as silica brick or other high temperature resisting substance, and the upper portion of the heat exchanger is connected to a hot blast main 45, the end of which leads to the tuyeres of a blast furnace. A back draft by-pass to the stack, not shown, is provided at 46 with a control motor operated gate valve 47.

The top of the heat exchanger is provided with a dome shape closure 48. On each side of the heat exchanger is a rotary kiln 51 that is mounted on rollers 52 and 53 supported on the structural members 54. The kiln is fired by burners generally designated by the numeral 55 and the products of combustion from the kiln are taken off at 56 to a waste gas conduit 57 that is connected to the chamber 6 of the recuperator, as shown in FIGURE 1.

Figure 4:
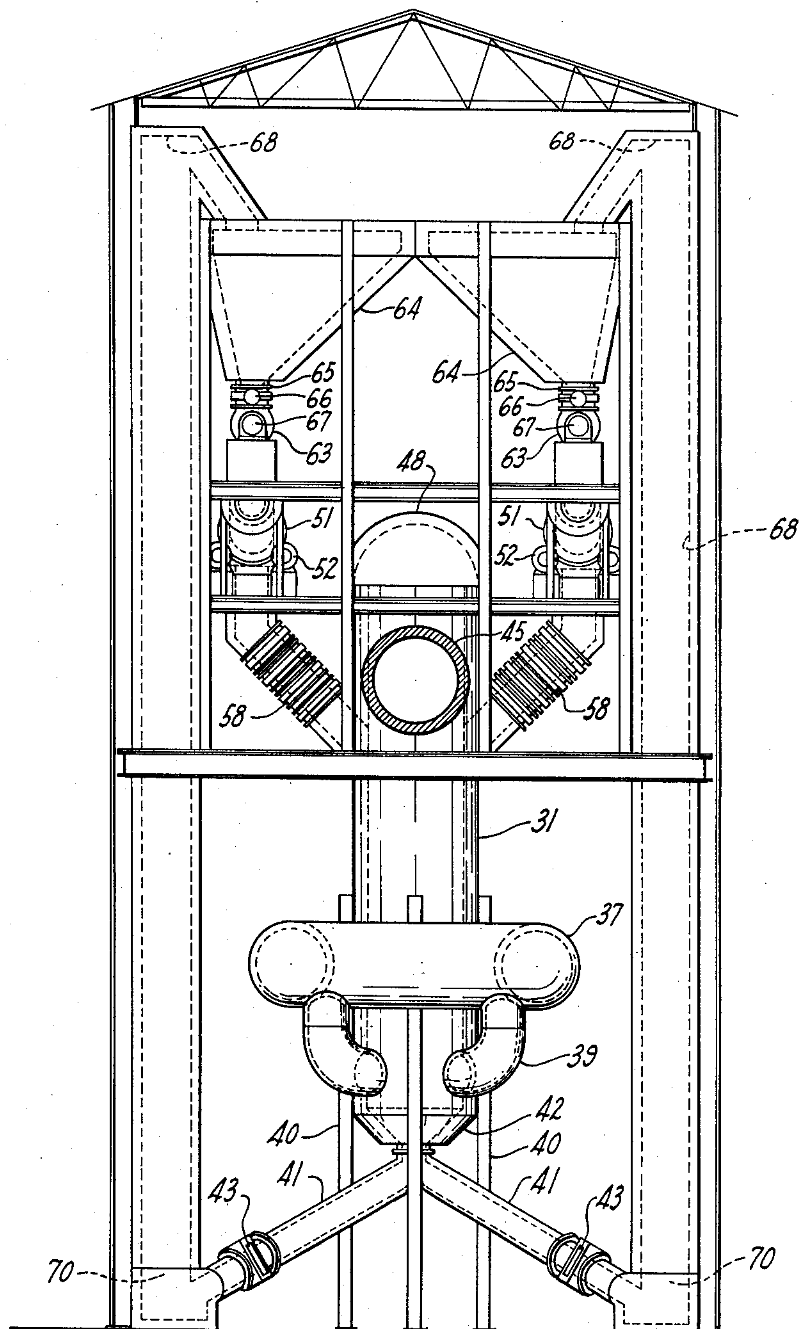
FIGURE 4 is an end elevational view, partially in section, taken along the line 4—4 of FIGURE 2; and, FIGURE 5 is a view similar to FIGURE 1, diagrammatically illustrating control mechanism for the recuperator and regenerator.

The rotary kiln is inclined so that the refractory particles are fed by gravity to receiving chambers 49 that open in to the heat exchanger 31, FIGURE 4, and chambers 49 are provided with a series of cycling dump gates generally designated by the numeral 58 that are operated by hydraulic cylinders 59 to successively discharge materials from the upper gate 58 to the lower one, there being four shown in the drawing. By thus successively feeding the material downward, the cyclic gates act as valves to prevent the escape of hot air from the heat exchanger 31. As shown, steps 60 may be provided to make the upper floor accessible with the level of the upper recuperator structure.

The rotary kilns 51 are provided with a delivery duct 61 leading to a vertical duct 62 in which is connected a rotary feeder 63 to which material flows by gravity from a hopper 64 through slide gates or valves 65 that are operated by cylinders 66. The rotary feeders are operated by variable speed motors 67.

The hoppers 64 are connected to chutes 68 in which are mounted endless conveyors 69 that deliver refractory particles from the bin 70 at the bottom to convey and dump it into the hoppers 64 at the top. The hoppers 64 are of a substantial size for storing particles of a highly refractory quality which, when heated, will not disintegrate nor will they readily spall or break when dropped from a great height.

In FIGURE 5 is shown the controls for the recuperator and regenerator. A temperature sensing device or thermocouple 75 and 76 is located in the hot air discharge manifolds 33 and 34, respectively. These are connected to a recorder controller 93 which in turn control the fuel valve operators 79 and 80 of valves 81 and 82. When the pressure on opposite sides of the orifice plate 83 and 84 in fuel lines 85 and 86 is unbalanced by opening of the valves 81 and 82, the fuel air ratio regulators 87 and 88 are energized and valve operators 89 and 90 of air supply lines 91 and 92 will open valves 93 and 94.

Orifice plates 95 and 96 in the air supply lines create a pressure differential that, together with orifice plates 83 and 84 in the fuel lines, maintain the proper fuel air ratio of the burners to produce the desired preheat temperature of the air leaving the recuperators at 33 and 34. The controls themselves are conventional burner controls and are not claimed separately as part of the present invention. A thermocuple 97 is provided to maintain suitable furnace temperatures in the combustion chambers 6 and is connected to the recorder controllers 77 and 78 that control the valve operators 79 and 80 to counteract the demand for heat called for by thermocouples 75 and 76.

The burner 55 of the kiln 51 for heating the pellets is similarly controlled by thermocouple 99 connected to recorder controller 100 for valve operator 101. The fuel air ratio regulator 102 energizes valve operator 103 and the double lines 104 and 105 across fuel and air orifice plates 106 and 107 make the fuel air ratio regulator responsive to pressure differentials on opposite sides of the plates. A suitable predetermined temperature is thereby maintained in the kiln for heating the pellets.

The hydraulic cylinders 59 that operate the cycling dump gates 58 are actuated by valve operators 110, 111, 112 and 113 controlled by timer 114 to function in their proper sequence.

The pellet level designated by the dotted line **43*a* at the bottom of the regenerator 31 is maintained by a controller 115 which energizes valve operator 116 of valve 43 to control the rate of flow of the pellets to the conveyor bin 70**.

Since the ultimate temperature of the hot air blast in the hot blast main 45 is controlled by the rate at which the pellets are fed to the heating kiln 51 and fall through the regenerator chamber 31 a temperature sensing thermocouple 117 is placed in the main 45 and is connected to a recording controller 118 that regulates operator or switch 119 of rotary feeder motor 67.

The operation of the above described apparatus for preheating the air for the blast furnace tuyeres is briefly as follows:

The hopper 64 is charged with particles or pellets of refractory material which pass through the slide gate 65 to the rotary feeder 63 which feeds a predetermined volume of the pellets into the rotary heating kiln 51. It is to be noted that slide gate 65 is operated by a fluid cylinder and the rotary feeder 63 by a motor. This is so that the feeding of pellets to the kiln may be discontinued in an emergency regardless of power failure.

The kiln burner 55 and the burner in the recuperator combustion chamber 6 at the burner port 7 are connected to the blast furnace gas as a source of fuel and the flame is projected into the rotary kiln 51 to heat the particles fed therein to a very high degree. Hot air from the recuperators 1 and 2, which is delivered from the header boxes 11 and 12 to the manifold 32 passes into the heat exchanger 31 through the bustle pipe 37 and air spouts 39 and rises upwardly to pass into the hot blast main 45. In its upward flow, the preheated air from the recuperators contact the heated particles from the rotary kiln 51 which are fed through the cycling dump gates 58 and dropped to the bottom or hopper portion 42 of the heat exchanger. The preheated air from the bustle pipe passing upward in the heat exchanger is in heat exchange relation with the heated particles and absorbs the heat therefrom before passing to the hot blast main 45 and to the tuyeres.

A certain amount of the particles are permitted to accumulate in the bottom hopper portion 42 of the heat exchanger to maintain a seal **43*a* preventing the escape of hot air through the base of the heat exchanger and a predetermined level is maintained by the automatically controlled slide gate 43. The cooled particles pass through conduit 41 from the hopper 42 into the bin 70 from where they are lifted by the endless conveyor 69 and delivered to the hopper 64.**

The combined heat from the burner in the burner port 7 of the recuperator combustion chamber 6 plus the waste gases from the rotary kiln 51 entering from duct 57 pass through the recuperator chambers 1 and 2 in wiping contact with the suspended recuperator tubes 22, which are preferably made of stainless steel to resist corrosion from the chemicals in the furnace gases. The temperature differential between the products of combustion from the combustion chamber 6 and the cold air passing inwardly through the recuperator tubes 22 keeps the metal temperature of the stainless steel tubes at approximately 1500°, which produces an air temperature of approximately a thousand degrees F. that is delivered from the recuperators through the manifold 32 to the bustle pipe 37 and into the heat exchanger 31. By means of regulating the temperature at which the particles are heated in the rotary kiln 51 and the rate of feeding them from the hopper 64, the blast air for the blast furnaces can be raised from approximately 1000° F. to 2000° F. or over, which is highly desirable for present-day blast furnace operations.

The total volume of air available by means of the apparatus herein shown depends on the number and capacity of the recuperators, and as shown in FIGURE 2 of the drawing, two complete independent conveyor and hopper systems, together with heating kilns, are provided and by the use thereof air temperatures could be raised as high as from 2600 to 2800° F. if required.

Although one embodiment of the invention has been herein illustrated and described, it will be evident to those skilled in the art that various modifications may be made in the details of construction without departing from the principles herein set forth, and that the combination of recuperator and regenerator for preheating and superheating air may be applied to various types of industrial furnaces and to different uses.

We claim:

1. In a multiple stage system for preheating combustion air, a plurality of recuperator units each having a heat exchange chamber with header boxes having banks of recuperator tubes suspended therefrom and extending into said chambers, said banks of tubes consisting of inner tubes and outer tubes of metal for passing air to be heated therethrough and therebetween, each of said heat exchange chambers having a combustion chamber, a burner in said combustion chamber connected to a source of fuel and a source of combustion air, valves controlling the supply of fuel and air to said burner, means for passing hot gases from said combustion chamber in wiping contact with the outer tubes in the heat exchange chamber, means for passing cold air through the inner tubes around and up the inner wall of the outer tubes in wiping contact therewith to heat the same, a hot air manifold connected to the header boxes of all of said recuperator units for receiving said heated air, a sensing device disposed in said hot air manifold, a controller recorder connected to said sensing device and said fuel valve for actuating said fuel valve and an air valve operator responsive to variations in the fuel supply to said burner and to operate said air valve to obtain a predetermined fuel-air ratio, said multiple recuperator units being operable to provide a desired volume of preheated air of constant temperature.

2. A multiple stage system for preheating combustion air as set forth in the next preceding claim in which the hot air manifold is connected to a regenerator for increasing the temperature of the preheated air beyond the metal temperature of the tubes in the recuperator structures and means for delivering the products of combustion from the regenerator to the combustion chambers of said recuperator structures.

References Cited in the file of this patent

UNITED STATES PATENTS

| | | |
|---|---|---|
| 931,565 | Caygill | Aug. 17, 1909 |
| 1,148,331 | Olsson | July 27, 1915 |
| 1,178,667 | Niewerth | Apr. 11, 1916 |
| 1,203,944 | Weber | Nov. 7, 1916 |
| 1,904,153 | Lucke | Apr. 18, 1933 |
| 1,914,956 | Naismith et al. | June 20, 1933 |
| 2,152,546 | Fitch | Mar. 28, 1939 |
| 2,245,773 | Grant | June 17, 1941 |
| 2,758,591 | Hubbard | Aug. 14, 1956 |
| 2,836,365 | Swenson et al. | May 27, 1958 |
| 2,893,639 | Martin | July 7, 1959 |
| 2,906,516 | Tinker | Sept. 29, 1959 |
| 2,947,522 | Keller | Aug. 2, 1960 |

FOREIGN PATENTS

| | | |
|---|---|---|
| 121,905 | France | Jan. 8, 1878 |
| 662,210 | Great Britain | Dec. 5, 1951 |